United States Patent [19]
Greenwood

[11] Patent Number: 4,839,530
[45] Date of Patent: Jun. 13, 1989

[54] INFORMATION HANDLING AND CONTROL SYSTEMS

[75] Inventor: Jeremy J. Greenwood, Sutton Coldfield, England

[73] Assignee: Salplex Limited, United Kingdom

[21] Appl. No.: 141,537

[22] Filed: Jan. 7, 1988

[30] Foreign Application Priority Data

Jan. 23, 1987 [United Kingdom] .......................... 8701496

[51] Int. Cl.⁴ .......................... B62D 45/00; J02J 1/00
[52] U.S. Cl. .................................. 307/10.1; 307/9.1; 307/10.8; 340/459
[58] Field of Search .................. 307/10 R, 9, 34, 35, 307/38, 39, 40, 41; 340/52 R, 310 R, 52 F, 310 A, 825.79, 825.98, 825.05, 825.54, 825.07; 370/58

[56] References Cited

U.S. PATENT DOCUMENTS

| | | | |
|---|---|---|---|
| 4,302,841 | 11/1981 | McCulloch | 307/10 R X |
| 4,370,561 | 1/1983 | Briggs | 307/9 |
| 4,386,279 | 5/1983 | Yoshimi et al. | 307/10 R |
| 4,551,801 | 11/1985 | Sokol | 340/52 F X |
| 4,616,224 | 10/1986 | Reighard | 307/10 R X |
| 4,639,609 | 1/1987 | Floyd et al. | 307/10 R |
| 4,658,150 | 4/1987 | Mizuno et al. | 307/10 LS X |
| 4,677,308 | 6/1987 | Wroblewski et al. | 340/52 F X |

*Primary Examiner*—William M. Shoop, Jr.
*Assistant Examiner*—Paul Ip
*Attorney, Agent, or Firm*—Kirschstein, Ottinger, Israel & Schiffmiller

[57] ABSTRACT

A battery (+V) operable information handling and control system, for example for an automotive vehicle electrical system, has a central unit (10) and a number of remote units (20) each connected to the central unit (10) by a respective signalling link (40). The central unit (10) includes processing and control circuitry (13) and power supply circuitry (11) which are turned on to operate the processing and control circuitry (13) in an active mode of the system and are turned off in a sleep mode of the system. During the active mode the processing and control circuitry (13) applies a clock pulse voltage to a data line (41) in each signalling link (40). One of the clock pulse lines (41) is connected to power supply control circuitry (12) in the central unit (10) and to activation voltage drive circuitry (80) in the respective remote unit (20). When the system is in the sleep mode the activation voltage drive circuitry (80) can be enabled by operation of a activation switch (60, 61) connected to that remote unit (20) so as to apply to that clock pulse line (41) an activation voltage, substantially the battery +V voltage (12 volts) and lower than the clock pulse voltage (30 volts). The power supply control circuitry (12) is enabled by the activation voltage so as to turn on the power supply circuitry (11) and the activation voltage drive circuitry (80) is then disabled responsive to the clock pulse voltage consequently applied at the start of the active mode.

9 Claims, 1 Drawing Sheet

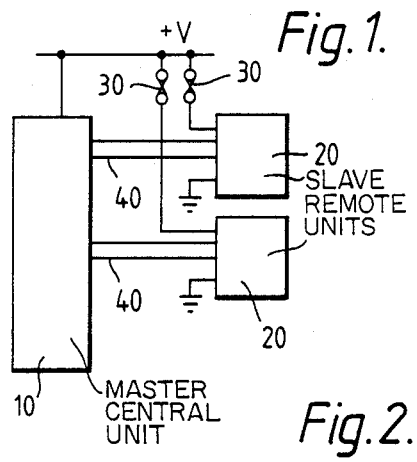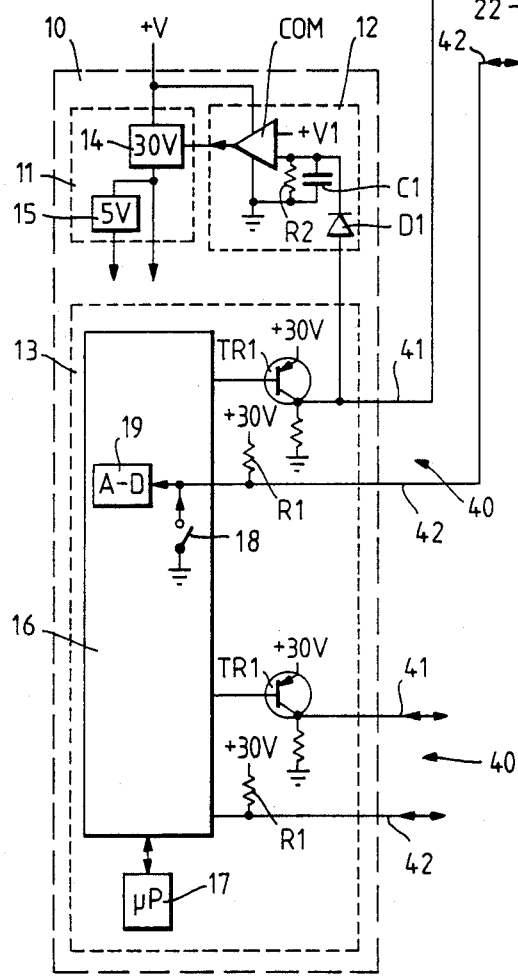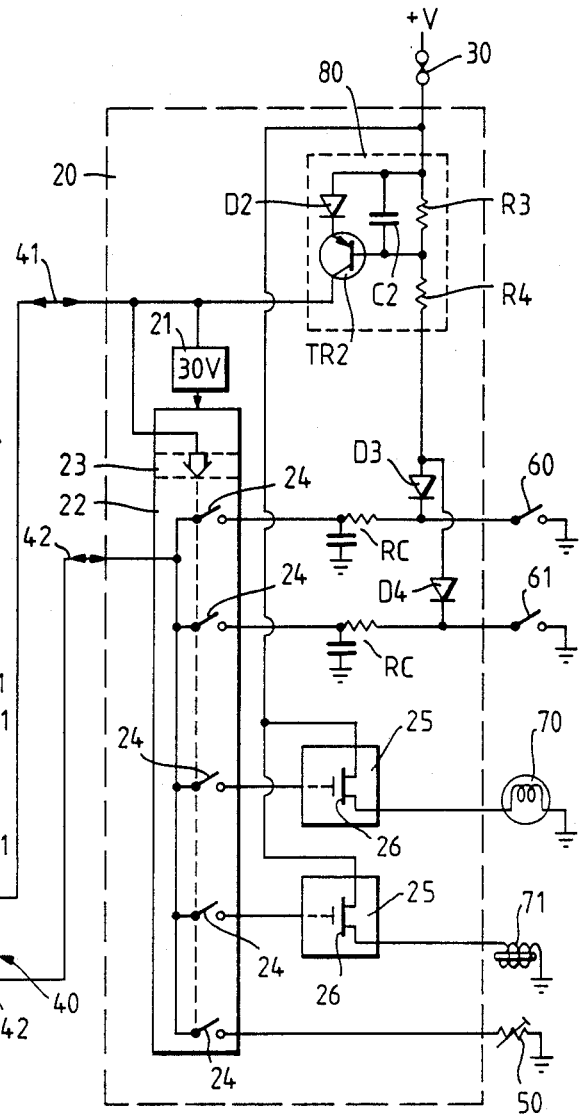

INFORMATION HANDLING AND CONTROL SYSTEMS

BACKGROUND OF THE INVENTION

1. Field of the Invention

This invention relates to information handling and control systems, for example for inclusion in automotive vehicle electrical systems.

In particular this invention relates to an information handling and control system comprising a central unit and a plurality of remote units each connected to the central unit by a respective signalling link, the system being operable by battery means when connected to the central unit and to at least some of the remote units, wherein the central unit includes processing and control means and power supply means therefor.

2. Description of Related Art

An example of such a system in the form of an automotive vehicle electrical system is known from the article "Multiplexing for the automotive industry" by W. R. Betts in GEC REVIEW, Vol. 2, No. 1, 1986 at pages 32 to 36.

In order to minimize current drain and conserve the capacity of the battery means in such a system it is desirable to provide for a sleep mode of the system in which the power supply means in the central unit are turned off, as well as an active mode of the system in which the power supply means are turned on to operate the processing and control means. In such a system where the user has access only to the remote units it is necessary to provide means for the user to bring the system out of its sleep mode by activation from a remote unit. For example in an automotive vehicle electrical system, it may be desirable to provide for activation from any of a number of different switches such as an ignition switch or sidelight switch which may be connected to the same remote unit, a door opening switch connected to another remote unit, and possibly a system test mode switch connected to yet another remote unit.

It is possible for the remote activation means to include a dedicated activation wire, extra to the signalling links, between the central unit and any remote unit from which the user is to be able to bring the system into its active mode. However there is a significant cost disadvantage in providing such extra activation wires together with associated connector pins and additional means for noise suppression.

SUMMARY OF THE INVENTION

An object of the invention is to provide a system with means for remote activation but without a dedicated activation wire, and the invention is based on the idea of temporarily applying to an existing line of a signalling link an activation voltage level which is different from the active mode operation voltage on that line.

According to the invention there is provided an information handling and control system comprising a central unit and a plurality of remote units each connected to the central unit by a respective signalling link, the system being operable by battery means when connected to the central unit and to at least some of the remote units, wherein the central unit includes processing and control means and power supply means which are turned on to operate the processing and control means in an active mode of the system and are turned off in a sleep mode of the system, wherein during said active mode the processing and control means applies an operation voltage in pulse form to a data line in each signalling link, wherein one of said data lines is connected to power supply control means in the central unit and to activation voltage drive means in the respective remote unit, the power supply control means and the activation voltage drive means being fed by the battery means during both the sleep mode and the active mode, wherein when the system is in the sleep mode the activation voltage drive means can be enabled by operation of an activation switch connected to that remote unit so as to apply an activation voltage, different from said operation voltage, to that data line, and wherein the power supply control means is enabled responsive to the activation voltage so as to turn on the power supply means and the activation voltage drive means is then disabled responsive to the operation voltage consequently applied at the start of the active mode.

Reliability of the system according to the invention may be enhanced by arranging that when the system is in the active mode the activation voltage drive means are maintained disabled responsive to the pluse form operation voltage. This may be achieved in an advantageously simple and economical manner by provision in the activation voltage drive means of a bipolar transistor having its activation voltage drive means of a bipolar transistor having its emitter fed by the battery means, its collector connected to said data line, and its base connected to said activation switch and to a capacitor, and the arrangement of the activation voltage drive means being such that when the system is in the sleep mode the capacitor is discharged and the transistor is turned off, such that responsive to operation of the activation switch when the system is in the sleep mode the transistor is turned on so as to apply said activation voltage, less than said operation voltage, to said data line, such that responsive to the operation voltage consequently applied at the start of the active mode the capacitor is charged via the transistor collector-base diode so as to turn off the transistor, and such that when the system is in the active mode the capacitor is maintained charged responsive to the pulse form operation voltage so as to maintain the transistor turned off.

The battery means in the system according to the invention may apply the same battery voltage to the central unit and to the remote units, said activation voltage being substantially said battery voltage, and said power supply means converting said battery voltage to a higher voltage to be applied as said operation voltage to the data lines. For example, when the system according to the invention is incorporated in an automotive vehicle electrical system the battery voltage will be 12 volts and the higher operation voltage may be 30 volts. Such a higher operation voltage has noise immunity and other advantages as described in the above-mentioned GEC REVIEW article.

The system according to the invention may be arranged such that when it is in the active mode the power supply control means in the central unit are maintained enabled responsive to the pulse form operation voltage, and furthermore such that it reverts to the sleep mode when the power supply control means are disabled responsive to discontinuation of the pulse form operation voltage. This arrangement whereby the control and processing means simply discontinues the pulse form operation voltage for the purpose of turning off the power supply means, rather than the control and processing means having to provide a special output signal for this purpose, ensures reliable switching of the system between the active mode and the sleep mode.

The arrangement described in the previous paragraph may be simply and economically achieved by providing that the power supply control means have an input connected to said data line and to a capacitor, the arrangement of the power supply control means being such that when the system is in the sleep mode that capacitor is discharged, such that responsive to said activation voltage that capacitor is charged above a reference voltage value whereupon the power supply control means output turns on the power supply means, such that that capacitor is maintained charged above said reference voltage value responsive to the pulse form operation voltage, and such that responsive to discontinuation of the pulse form operation voltage that capacitor discharges to below said reference voltage value whereupon the power supply control means output turns off the power supply means.

The system according to the invention may be arranged such that at least some of the remote units having said battery means connected thereto have loads connected to them and at least some of the remote units have function switches connected to them, said loads being indirectly operable by said function switches via the processing and control means in the central unit. For example when incorporated in an automotive vehicle electrical system these loads may include the ignition, lamps and motors.

Although remote activation of the system according to the invention may be provided for from one or more switches specially provided for that purpose, it is clearly advantageous in a system as described in the previous paragraph for the user to be able to remotely activate the system by operating one of the function switches. This may be achieved in such a system wherein each said signalling link said data line is a clock pulse line with said operation voltage in pulse form constituting clock pulses, wherein each said signalling link also includes a signal line which is connected to a corresponding one of a plurality of demultiplexer channels in the respective remote unit in an assigned time slot under control of said clock pulses, wherein each of said loads and said function switches are connected to a respective said demultiplexer channel, and wherein said activation switch is one of said function switches, the arrangement being such that when the system has been put into the active mode responsive to operation of the combined activation-function switch, the operated function condition of said combined activation-function switch is then detected by the processing and control means via the respective signal line.

In a system as described in the previous paragraph, at least two said combined activation-function switches may be connected in parallel to said activation voltage drive means in the same remote unit, in which case means are provided for maintaining mutual isolation of the demultiplexer channels to which those combined activation-function switches are connected.

BRIEF DESCRIPTION OF THE DRAWINGS

The invention will now be described in more detail with reference to the accompanying drawings, in which:

FIG. 1 is an overall schematic diagram of an information handling and control system for an automotive vehicle electrical system as described in the above-mentioned GEC REVIEW article, and FIG. 2 shows details of the system of FIG. 1 incorporating the features of the invention.

DETAILED DESCRIPTION OF THE PREFERRED EMBODIMENT

Referring now to FIG. 1, there is shown a star wired system with an intelligent, central, master unit 10 and a number of non-intelligent, remote, slave units 20. The system is operable by battery means +V when connected to the central unit 10 and via fuses 30 to the remote units 20. A low current signalling link 40 is connected from the central unit 10 to each remote unit 20. Manually operable electrical switches, sensors, and high current loads (not shown in FIG. 1) are connected to the remote units 20 and their interaction is controlled from the central unit 10 by means of time slot assignment multiplex.

Referring now to FIG. 2, the central unit 10 includes power supply means 11, power supply control means 12 and processing and control means 13. 30 volt and 5 volt switched mode power supplies 14, 15 in the power supply means 11 are fed by the battery +V which is 12 volts in an automotive vehicle electrical system. So as to minimize current drain and conserve battery power, the system has a sleep mode in which the power supply means 11 are turned off by the power supply control means 12, which are also fed by the battery +V, and an active mode in which the power supply means 11 are turned on by the power supply control means 12. In the active mode of the system the power supplies 14, 15 operate a custom unit 16 and a microprocessor 17 connected thereto in the processing and control means 13. Each low current signalling link 40 to a remote unit 20 has two data lines 41, 42 to each of which the processing and control means 13 applies an operation voltage in pulse form during the active mode of the system. Each data line 41 is a clock pulse line with the respective operation voltage in pulse form constituting clock pulses of 30 volts amplitude which are applied to that line 41 by a clock driver transistor TR1 under control of the custom unit 16 and which control the timing of the system time slot assignment multiplex. Each data line 42 is a signal line, and in each time slot a respective switch 18 in the custom unit 16 controls the application to that signal line 42 of zero volts or the fixed voltage supply of 30 volts via a pull-up resistor R1.

In each remote unit 20, one of which is shown in FIG. 2, a 30 volt power supply 21 is derived from the clock pulses on the line 41 during the active mode of the system. A demultiplexing unit 22 has timing circuits 23 responsive to the clock pulses on the line 41 and from which switches 24 are operated to connect the signal line 42 of the low current signalling link through a corresponding demultiplexer channel in the appropriate time slot. Each remote unit 20 can connect for example sixteen channels, five of which are shown in FIG. 2.

A variable resistor sensor 50 is shown wired to one of the channels in the remote unit 20. With the sensor 50 connected in the signal line 42 during the appropriate time slot and the switch 18 in the central unit 10 open during that time slot, then the voltage on the signal line 42 is an input signal from the sensor 50 due to its resistance, and this input signal is recognized via an analogue-to-digital converter 19 in the central unit 10.

Two manually operable electrical toggle switches 60, 61 are shown each wired to a respective other one of the channels in the remote unit 20 via an R-C filter. With each switch 60, 61 connected in the signal line 42 during its appropriate time slot and the switch 18 in the central unit 10 open during that time slot, then the voltage on the signal line 42 due to the resistance between the two terminals of that switch 60, 61 is recognized via the analogue-to-digital converter 19 in the central unit 10 as a respective first or second condition of a binary input signal from that switch 60, 61.

Two other channels in the remote unit 20 are shown each connected in the remote unit to a respective output circuit 25. The state of the switch 18 during the appropriate time slot will provide an output signal on the signal line 42 to power switching means 26 in the respective output circuit 25 to control a high current from the battery +V via a fuse 30 to a respective load, for example a lamp 70 or a starter switch solenoid 71, wired to the remote unit 20. The microprocessor 17 in the central unit 10 ensures that the output signal on a signal line 42 to control a high current to a particular load 70, 71 connected to any one of the remote units 20 is in response to an input signal from a particular switch 60, 61 which is to be associated with that load 70, 71 and is connected to any one of the remote units 20.

The low currents in the low current signalling links of the system, for example through the signal line 42 when it includes one of the switches 60, 61 may be, for example, not greater than 5 mA. The high currents through the loads of the system, for example to one of the loads 70, 71 controlled in response to one of the switches 60, 61 may be, for example, up to 10 amps.

The power supply control means 12 in the central unit 10 are shown connected to one of the clock pulse lines 41 and activation voltage drive means 80 are shown connected to that clock pulse line 41 in the remote unit 20. The activation voltage drive means 80 are fed by the battery +V and are connected in parallel to each of the switches 60, 61. When the system is in the sleep mode the activation voltage drive means can be enabled by operation of one of the switches 60, 61 so as to apply an activation voltage, substantially equal to the 12 volt battery voltage +V, to the clock pulse line 41. The power supply control means 12 is enable responsive to the 12 volt activation voltage so as to turn on the power supply means 11 and the activation voltage drive means 80 is disabled responsive to the 30 volt clock pulse voltage consequently applied to the clock pulse line 41 at the start of the active mode of the system. When the system is in the active mode the activation voltage drive means 80 are maintained disabled and the power supply control means 12 are maintained enabled responsive to the clock pulses on the line 41. The system reverts to the sleep mode when the power supply control means 12 are disabled responsive to discontinuation of the clock pulses on the line 41. The detailed constitution and operation of the power supply control means 12 in the central unit 10 and the activation voltage drive means 80 in the remote unit 20 will be described below.

The power supply control means 12 consists essentially of a comparator COM fed by the battery +V during both the sleep mode and the active mode of the system. The output of the comparator COM is connected to the switched mode power supply 14 of the power supply means 11 so as to turn on or turn off that power supply 14 and hence also the power supply 15. One input of the comparator COM, effectively an input of the power supply control means 12, is connected to a capacitor C1, to a resistor R2 and, via an isolating diode D1, to the clock pulse line 41. The other input of the comparator COM is connected to a reference voltage +V1 which is derived directly from and has a value less than the 12 volt battery voltage +V. When the system is in the sleep mode the capacitor C1 is discharged and the output of the comparator COM maintains the power supply means 11 turned off. When the activation voltage of substantially 12 volts is applied to the line 41 by the activation voltage drive means 80 at the remote unit 20 the capacitor C1 is charged until it reaches a value above the reference voltage value +V1 whereupon the output of the comparator COM switches the system into the active mode by turning on the power supply means 11 to operate the control and processing means 13. The 30 volt clock pulse voltage applied to the line 41 by the clock driver transistor TR1 at the start of the active mode disables the activation voltage drive means 80 and hence the 12 volt activation voltage is removed from the line 41. However, the R2C1 time constant in relation to the duration of and intervals between the 30 volt amplitude clock pulses on the line 41 during the active mode of the system is such that the capacitor C1 is maintained charged above the reference voltage value +V1 responsive to the clock pulses and the output of the comparator COM remains stable to keep the power supply means 11 turned on. In order for the system to revert to the sleep mode it is simply necessary for the control and processing means 13 to discontinue application of the clock pulses to the lines 41 so that the capacitor C1 discharges to below the reference voltage value +V1 whereupon the output of the comparator COM turns off the power supply means 11.

The activation voltage drive means 80 in the remote unit 20 includes a p-n-p bipolar transistor TR2 having its emitter fed by the 12 volt battery +V, via a protective diode D2, during both the sleep mode and the active mode of the system. The collector of the transistor TR2 is connected to the clock pulse line 41. Two resistors R3, R4 are connected in series to the 12 volt battery +V. The two switches 60, 61 are connected in parallel via isolation diodes D3, D4 and the resistor R4 to the base of the transistor TR2. A capacitor C2 is connected across the resistor R3 to the base of the transistor TR2. When the system is in the sleep mode the capacitor C2 is discharged and the transistor TR2 is turned off. When one of the switches 60, 61 is operated the end of the resistor R4 connected to that switch is brought substantially to ground potential allowing base current to flow in the transistor TR2 which is thereby turned on to apply via its collector substantially +12 volts as the activation voltage to the clock pulse line 41. The R3C2 time constant in relation to the duration of the clock pulses on the line 41 is such when the +30 volt clock pulse voltage is consequently applied to the line 41 at the start of the active mode of the system it exceeds the substantially +12 volt activation voltage for a time sufficient to charge the capacitor C2 via the transistor TR2 collector-base diode to a value such that the transistor TR2 is turned off. While the system is in the active mode the R3C2 time constant in relation to the intervals between the 30 volt clock pulses on the line 41 is such that the capacitor C2 is maintained charged above a value sufficient to maintain the transistor TR2 turned off.

Once the system has been put into the active mode by operation of one of the switches 60, 61, as described above, then the operated condition of that switch 60, 61 is detected as a binary input signal by the processing and control means 13 in the central unit 10 via the signal line 42 in the appropriate time slot, and the microprocessor 17 ensures that in response to that input signal an output signal is provided on a line 42 to one of the remote units 20 to operate an associated load such as the load 70 or 71. During the active mode of the system the diodes D3, D4 provide means for maintaining mutual isolation of the demultiplexer channels to which the switches 60, 61 are connected.

Each of the switches 60, 61 may be termed a combined activation-function switch. That is to say that each switch 60, 61 is, by its connection to the activation voltage drive means 80, an activation switch by the operation of which the system may be brought into the active mode; and also each switch 60, 61 is, by its connection to one of the channels of the demultiplexing unit 22, a function switch whose binary input signal is recognized by the central unit 10 during the active mode of the system so as to indirectly operate an associated load connected to one of the remote units 20. Although it may be convenient to have more than one combined activation-function switch such as the switches 60, 61 connected in parallel to the activation voltage drive means 80 in the same remote unit 20, it is possible to have only one such combined activation-function switch connected to the activation voltage drive means 80 in that remote unit 20. Furthermore it is possible to have a switch which is connected to the activation voltage drive means 80 in the remote unit 20 so as to be operable as an activation switch, but which is not connected to a demultiplexer channel in the remote unit 20 and so is not operable as a function switch. Such an activation switch may be a manually operable toggle switch, or it may be incorporated in a connector for equipment to operate the system in a test mode.

The system may have activation voltage drive means 80 in only one of the remote units 20 with power supply control means 12 connected in the central unit 10 to the clock pulse line 41 in the signalling link 40 to that remote unit. However, activation voltage drive means 80 may be provided in more than one of the remote units 20 with corresponding power supply control means 12 connected in the central unit 10 to the clock pulse line 41 of each respective signalling link 40; in this case the outputs of the power supply control means 12 connected to the respective clock pulse lines 41 may be connected in parallel to the power supply means 11 and the system may be activated from any one of the remote units 20 having an activation voltage drive means 80.

Each remote unit 20 having activation voltage drive means 80 must be connected to the battery means +V, and each remote unit 20 having connected to it at least one load such as the load 70 or 71 must be connected to the battery means +V. There may be remote units 20 in the system which have only switches such as switches 60 or 61 and/or sensors such as sensor 50 connected to them and therefore strictly do not require to be connected to the battery means +V. However, in practice it will be convenient to provide a single cable to each remote unit which carries the signalling link 40 and also a battery connection wire; and this has the added advantage that a system may be modified by having a load connected to a hitherto unused channel at a remote unit.

In the system described above with reference to FIG. 2 the battery means +V applies the same 12 volt battery voltage to the central unit 10 and to the remote units 20, the activation voltage is substantially the 12 volt battery voltage and the power supply means 11 converts the battery voltage into a higher voltage of 30 volts to be applied as the clock pulse voltage. In the application to an automotive vehicle electrical system there are noise immunity and other advantages provided by the 30 volt amplitude applied to the signalling lines 40. However, the particular circuit implementation of the activation voltage drive means 80 as described above relies essentially on the activation voltage being less than the clock pulse voltage so that after activation of the system the transistor TR2 is turned off by charging the capacitor C2 via the transistor collector-base diode. This circuit implementation would also work if, for example, the clock pulse voltage amplitude were 5 volts and a lower activation voltage of say 2½ volts were derived from the battery at the remote unit 20.

While the circuit implementation of the activation voltage drive means 80 is particularly simple and reliable, it is envisaged that a logic circuit alternative could be provided which would respond to operation of an activation switch connected to the remote unit so as to apply an activation voltage to a data line in a signalling link to the central unit and then be disabled responsive to the operation voltage consequently applied by the central unit to that data line at the start of the active mode. In this case the activation voltage drive means could be maintained disabled other than in response to the pulse form operation voltage on the data line to which it is connected, and in this case the activation voltage need not be of smaller amplitude than that of the pulse form operation voltage although it must be significantly different from that operation voltage.

Finally, it is envisaged that the use of an existing data line which conveys a pulse form operation voltage in normal active mode operation of the system also to convey a different amplitude activation voltage to bring the system out of its sleep mode can apply to battery operated star wired information handling and control systems in which that dual purpose data line is not necessarily a clock pulse line, and furthermore in which the system is not necessarily adapted for the remote indirect operation of loads as in an automotive vehicle electrical system.

I claim:
1. An information handling and control system, comprising:
 (a) a central unit and a plurality of remote units each connected to the central unit by a respective signalling link;
 (b) battery means for operating the system when connected to the central unit and to at least some of the remote units;
 (c) said central unit including processing and control means and power supply means, the latter being turned on to operate the processing and control means in an active mode of the system and being turned off in a sleep mode of the system;
 (d) said processing and control means being operative for applying, during said active mode, an operation voltage in pulse form to a data line in each signalling link;
 (e) one of said data lines being connected to power supply control means in the central unit and to activation voltage drive means in the respective remote unit;
 (f) said power supply control means and the activation voltage drive means being fed by the battery means during both the sleep mode and the active mode;
 (g) said activation voltage drive means being enabled during the sleep mode by operation of an activation switch connected to that remote unit so as to apply an activation voltage, different from said operation voltage, to that data line;

(h) said power supply control means being enabled responsive to the activation voltage so as to turn on the power supply means; and (i) said activation voltage drive means being then disabled responsive to the operation voltage consequently applied at the start of the active mode.

2. A system as claimed in claim 1, wherein when the system is in the active mode the activation voltage drive means are maintained disabled responsive to the pulse form operation voltage.

3. A system as claimed in claim 2, wherein the activation voltage drive means includes a bipolar transistor having its emitter fed by the battery means, its collector connected to said data line, and its base connected to said activation switch and to a capacitor, and wherein the arrangement of the activation voltage drive means is such that when the system is in the sleep mode the capacitor is discharged and the transistor is turned off, such that responsive to operation of the activation switch when the system is in the sleep mode the transistor is turned on so as to apply said activation voltage, less than said operation voltage, to said data line, such that responsive to the operation voltage consequently applied at the start of the active mode the capacitor is charged via the transistor collector-base diode so as to turn off the transistor, and such that when the system is in the active mode the capacitor is maintained charged responsive to the pulse form operation voltage so as to maintain the transistor turned off.

4. A system as claimed in claim 1, wherein the battery means applies the same battery voltage to the central unit and to the remote units, wherein said activation voltage is substantially said battery voltage, and wherein said power supply means converts said battery voltage to a higher voltage to be applied as said operation voltage to the data lines.

5. A system as claimed in claim 1, wherein when the system is in the active mode the power supply control means are maintained enabled responsive to the pulse form operation voltage, and wherein the system reverts to the sleep mode when the power supply control means are disabled responsive to discontinuation of the pulse form operation voltage.

6. A system as claimed in claim 5, wherein said power supply control means have an input connected to said data line and to a capacitor, the arrangement of the power supply control means being such that when the system is in the sleep mode that capacitor is discharged, such that responsive to said activation voltage that capacitor is charged above a reference voltage value whereupon the power supply control means output turns on the power supply means, such that that capacitor is maintained charged above said reference voltage value responsive to the pulse form operation voltage, and such that responsive to discontinuation of the pulse form operation voltage that capacitor discharges to below said reference voltage value whereupon the power supply control means output turns off the power supply means.

7. A system as claimed in claim 1, wherein at least some of the remote units having said battery means connected thereto have loads connected to them and at least some of the remote units have function switches connected to them, said loads being indirectly operable by said function switches via the processing and control means in the central unit.

8. An information handling and control system, comprising:

(a) a central unit and a plurality of remote units each connected to the central unit by a respective signalling link;

(b) battery means for operating the system when connected to the central unit and to at least some of the remote units;

(c) said central unit including processing and control means and power supply means, the latter being turned on to operate the processing and control means in an active mode of the system and being turned off in a sleep mode of the system;

(d) said processing and control means being operative for applying, during said active mode, an operation voltage in pulse form to a data line in each signalling link;

(e) one of said data lines being connected to power supply control means in the central unit and to activation voltage drive means in the respective remote unit;

(f) said power supply control means and the activation voltage drive means being fed by the battery means during both the sleep mode and the active mode;

(g) said activation voltage drive means being enabled during the sleep mode by operation of an activation switch connected to that remote unit so as to apply an activation voltage, different from said operation voltage, to that data line;

(h) said power supply control means being enabled responsive to the activation voltage so as to turn on the power supply means;

(i) said activation voltage drive means being then disabled responsive to the operation voltage consequently applied at the start of the active mode;

(j) at least some of the remote units, having said battery means connected thereto, having loads connected to them, and at least some of the remote units having function switches connected to them, said loads being indirectly operable by said function switches via the processing and control means in the central unit;

(k) said data line in each said signalling link being a clock pulse line with said operation voltage in pulse form constituting clock pulses;

(l) each said signalling link also including a signal line which is connected to a corresponding one of a plurality of demultiplexer channels in the respective remote unit in an assigned time slot under control of said clock pulses;

(m) each of said loads and said function switches being connected to a respective said demultiplexer channel;

(n) said activation switch being one of said function switches; and (o) said system in the active mode being responsive to operation of the combined activation-function switch, the operated function condition of said combined activation-function switch being then detected by the processing and control means via the respective signal line.

9. A system as claimed in claim 7, wherein at least two said combined activation-function switches are connected in parallel to said activation voltage drive means in the same remote unit, and wherein means are provided for maintaining mutual isolation of the demultiplexer channels to which those combined activation-function switches are connected.

* * * * *